United States Patent
Min et al.

(10) Patent No.: US 11,995,313 B2
(45) Date of Patent: May 28, 2024

(54) DATA STORAGE DEVICE IDENTIFYING TENANTS AND OPERATING METHOD THEREOF

(71) Applicants: SK hynix Inc., Icheon (KR); Sogang University Research and Business Development Foundation, Seoul (KR)

(72) Inventors: Donghyun Min, Goyang (KR); Youngjae Kim, Seoul (KR)

(73) Assignees: SK Hynix Inc., Icheon (KR); Sogang University Research and Business Development Foundation, Seoul (KR)

( * ) Notice: Subject to any disclaimer, the term of this patent is extended or adjusted under 35 U.S.C. 154(b) by 37 days.

(21) Appl. No.: 17/938,011

(22) Filed: Oct. 4, 2022

(65) Prior Publication Data

US 2023/0152967 A1 May 18, 2023

(30) Foreign Application Priority Data

Nov. 15, 2021 (KR) .......... 10-2021-0156588

(51) Int. Cl.
*G06F 3/06* (2006.01)
(52) U.S. Cl.
CPC .......... *G06F 3/0602* (2013.01); *G06F 3/0643* (2013.01); *G06F 3/0673* (2013.01)
(58) Field of Classification Search
CPC .... G06F 3/0602; G06F 3/0643; G06F 3/0673; G06F 3/0638; G06F 3/061; G06F 3/0679; G06F 16/2282; G06F 12/0238; G06F 16/2246; G06F 16/2272; G06F 2212/7202
See application file for complete search history.

(56) References Cited

U.S. PATENT DOCUMENTS

| 11,308,030 B2* | 4/2022 | Irazabal | .................... H04L 9/50 |
| 2004/0210582 A1* | 10/2004 | Chatterjee | ............... G06F 16/27 |
| | | | 707/999.009 |

(Continued)

FOREIGN PATENT DOCUMENTS

KR   10-2021-0063862 A   6/2021

OTHER PUBLICATIONS

Lee et al, "ILSM-SSD: An Intelligent LSM-tree based Key-Value SSD for Data Analytics," 2019 (Year: 2019).*

(Continued)

*Primary Examiner* — Farley Abad

(57) ABSTRACT

A data storage device includes a volatile memory device including a first table area storing a first table having a plurality of first unit information, and a nonvolatile memory device including a subtree area and a second table area. The second table area stores sorted string tables (SSTables) of level 0 each including a respective plurality of first unit information. Each first unit information includes a key corresponding to a key-value (KV) command and a namespace identifying a tenant providing that KV command. The second table area and the subtree area form a data structure which can be queried with a key included in a KV command. The subtree area includes a plurality of subtrees respectively corresponding to a plurality of namespaces, each subtree storing an SSTable of level 1 having a plurality of second unit information each having a key related to the corresponding namespace of that subtree.

16 Claims, 10 Drawing Sheets

(56) References Cited

U.S. PATENT DOCUMENTS

| | | | | |
|---|---|---|---|---|
| 2013/0204991 | A1* | 8/2013 | Skjolsvold | G06F 9/5083 709/223 |
| 2018/0225315 | A1 | 8/2018 | Boles et al. | |
| 2019/0005066 | A1* | 1/2019 | Bao | G06F 9/45558 |
| 2020/0341889 | A1 | 10/2020 | Idreos et al. | |
| 2022/0319597 | A1* | 10/2022 | Moyer | G11C 15/046 |

OTHER PUBLICATIONS

Wu et al, "KVSSD: Close Integration of LSM Trees and Flash Translation Layer for Write-Efficient KV Store," 2018 (Year: 2018).*

J. Ahn et al., "Diskshield: A Data Tamper-Resistant Storage for Intel SGX," In Proceedings of the 15th ACM Asia Conference on Computer and Communications Security (ASIACCS), 2020, ACM, p. 799-812.

J. Bhimani et al., "Fine-grained Control of Concurrency within KV-SSDs," In Proceeding of the 14th ACM International System and Storage Conference (Systor), 2021, ACM, p. 1-12.

A. Gulati et al., "pClock: An Arrival Curve based Approach for QoS Guarantees in Shared Storage Systems," ACM Sigmetrics Performance Evaluation Review 35, 2007, p. 1,13-24.

J. Hennessy et al., "Computer Architecture: A Quantitative Approach," Elsevier, 2011, 5th edition, Waltham, MA.

J. Im et al., "Pink: High-speed In-storage Key-value Store with Bounded Tails, " In Proceeding of the USENIX Annual Technical Conference (ATC), 2020, USENIX, p. 173-187.

S. Jain et al., "Application-Level Isolation and Recovery with Solitude," In Proceedings of the 3rd ACM SIGOPS/EuroSys European Conference on Computer Systems, 2008, p. 95-107.

Y. Jin et al., "Kaml: A Flexible, High-Performance Key-Value SSD," In Proceeding of the IEEE International Symposium on High Performance Computer Architecture (HPCA), 2017, p. 373-384, IEEE.

W. Lang et al., "Towards Multi-Tenant performance SLOs," IEEE Transactions on Knowledge and Data Engineering, 2013, pp. 1447-1463, vol. 26, No. 6.

C.-G. Lee et al., "iLSM-SSD: An Intelligent LSM-tree based Key-Value SSD for Data Analytics," In Proceeding of the 27th International Symposium on Modeling, Analysis, and Simulation of Computer and Telecommunication Systems (MASCOTS), IEEE, 2019, p. 384-395.

L. Lu et al., "WiscKey: Separating Keys from Values in SSD-conscious Storage," In Proceedings of the File and Storage Technologies (FAST), USENIX, 2016, p. 133-148.

P. O'Neil et al., "The Log-Structured Merge-Tree (LSM-tree)," Acta Informatica 33, 4, 1996, p. 351-385.

S. Rhea et al., "OpenDHT: A Public DHT Service and Its Uses," In Proceedings of the 2005 conference on Applications, technologies, architectures, and protocols for computer communications, 2005, p. 73-84.

D. Shue et al., "Performance Isolation and Fairness for Multi-Tenant Cloud Storage," In Proceeding of the 10th USENIX Symposium on Operating Systems Design and Implementation (OSDI), USENIX, 2012, p. 349-362.

S.-M. Wu et al., "KVSSD: Close Integration of LSM Trees and Flash Translation Layer for Write-efficient KV Store," In Proceeding of the Design, Automation & Test in Europe Conference & Exhibition (DATE), IEEE, 2018, p. 563-568.

Zhao et al., "TEE-aided Write Protection Against Privileged Data Tampering," In Proceedings of the Network and Distributed System Security Symposium (NDSS), USENIX, 2019.

Cosmos+, "OpenSSD Platform," http://www.openssd.io/, 2017.

Samsung Electronics, "Samsung Smart SSD," https://samsungatfirst.com/, 2018.

MongoDB, "Storage Engines," MongoDB Manual, https://docs.mongodb.com/manual/, 2016.

Facebook, "LevelDB", https://github.com/google/leveldb, 2017.

Google, "RocksDB: A Persistent Key-Value Store for Fast Storage Environment," https://rocksdb.org, 2012.

* cited by examiner

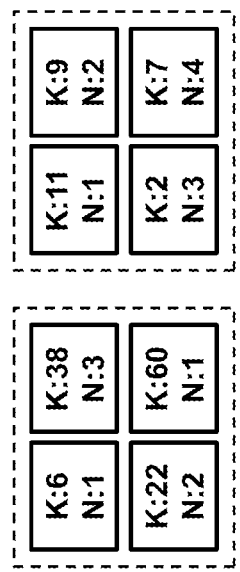
FIG. 10A
| Namespace | Key Range |
|---|---|
| 1 | 6 ~ 60 |
| 2 | 9 ~ 22 |
| 3 | 2 ~ 38 |
| 4 | 7 ~ 7 |
FIG. 10B
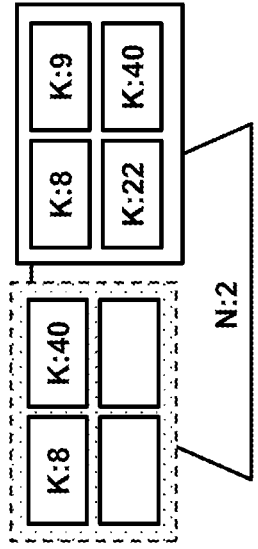
FIG. 10C
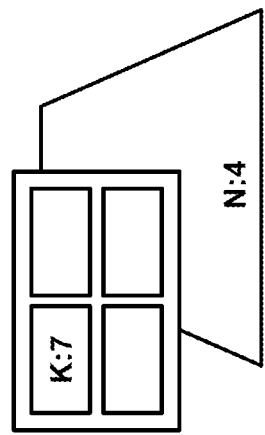
FIG. 10D
FIG. 10E
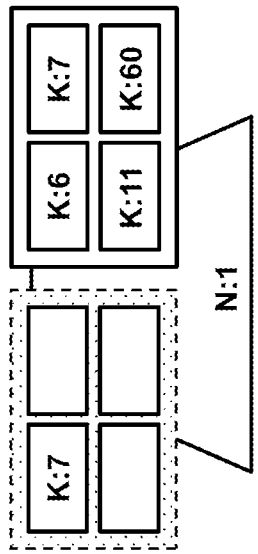
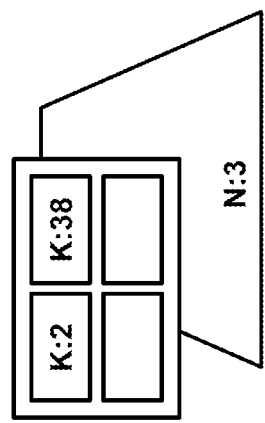
FIG. 10F

DATA STORAGE DEVICE IDENTIFYING TENANTS AND OPERATING METHOD THEREOF

CROSS-REFERENCE TO RELATED APPLICATION

The present application claims priority under 35 U.S.C. § 119(a) to Korean Patent Application No. 10-2021-0156588, filed on Nov. 15, 2021, which is incorporated herein by reference in its entirety.

BACKGROUND

1. Technical Field

Various embodiments generally relate to a data storage device that operates by identifying programs using the storage device, referred to herein as tenants, and an operating method thereof.

2. Related Art

Configuration and operation of a conventional key-value (KV) based data storage device has been disclosed in detail by articles such as Korean Patent Publication No. 10-2021-0063862A.

A conventional data storage device stores an offset value corresponding to a location where a value is stored together with a key by using a data structure such as a log structured merge (LSM) tree.

Since the conventional data storage device processes data without considering a tenant associated with the data, information of all tenants is managed by one LSM tree.

Accordingly, since all tenants share one LSM tree, as the size of the data structure increases, data read performance may deteriorate from a perspective of each tenant.

FIG. 1 illustrates a conventional data storage device 1.

A plurality of application programs 21, 22, and 23 in a host 2 operate by using the data storage device 1.

The plurality of application programs 21, 22, and 23 correspond to tenants, respectively.

The data storage device 1 stores a data structure in the form of an LSM tree 11, and the LSM tree 11 includes a data structure such as a plurality of tables arranged in a hierarchy.

Since multiple tenants share the LSM tree 11, if the number of tenants increases, data used by a first tenant 21 is more likely to move to a lower level of the LSM tree 11 in the course of operations for other tenants and read performance for the first tenant 21 may be degraded.

In addition, in the process of searching the LSM tree 11, the number of operations for loading a Bloom filter may increase, which may become a major factor of overall performance degradation.

In addition, because several tenants share one LSM tree 11, the possibility of data leakage increases and security may be weakened.

SUMMARY

In accordance with an embodiment of the present disclosure, a data storage device may include a volatile memory device including a first table area storing a first table having a plurality of first unit information; and a nonvolatile memory device including a subtree area and a second table area, the second table area storing one or more sorted string tables (SSTables) of a level 0 each having a meta area including a respective plurality of first unit information, wherein each first unit information includes a key corresponding to a respective key-value (KV) command and a namespace from among a plurality of namespaces, the namespace identifying a tenant providing the respective KV command, wherein the second table area and the subtree area form a data structure which can be queried with a key included in a KV command, wherein the subtree area includes a plurality of subtrees corresponding to a plurality of namespaces, and wherein each of the plurality of subtrees stores an SSTable of level 1 having a meta area having a plurality of second unit information each having a key related with a namespace corresponding to that subtree.

In accordance with an embodiment of the present disclosure, an operating method of a data storage device including a table area storing a sorted string table (SSTable) of a level 0 having a plurality of first unit information each including a key and a namespace, and a subtree area having a plurality of subtrees corresponding to a plurality of namespaces, each of the plurality of subtrees storing an SSTable of level 1 having a plurality of second unit information each having a key, the operating method may include selecting a victim SSTable in the table area; generating new SSTable corresponding to a namespace by using the victim SSTable; and adding the new SSTable as an SSTable of level in a subtree corresponding to the namespace.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

FIGS. 10A to 10F illustrate a compaction operation of a data storage device according to an embodiment of the present disclosure.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
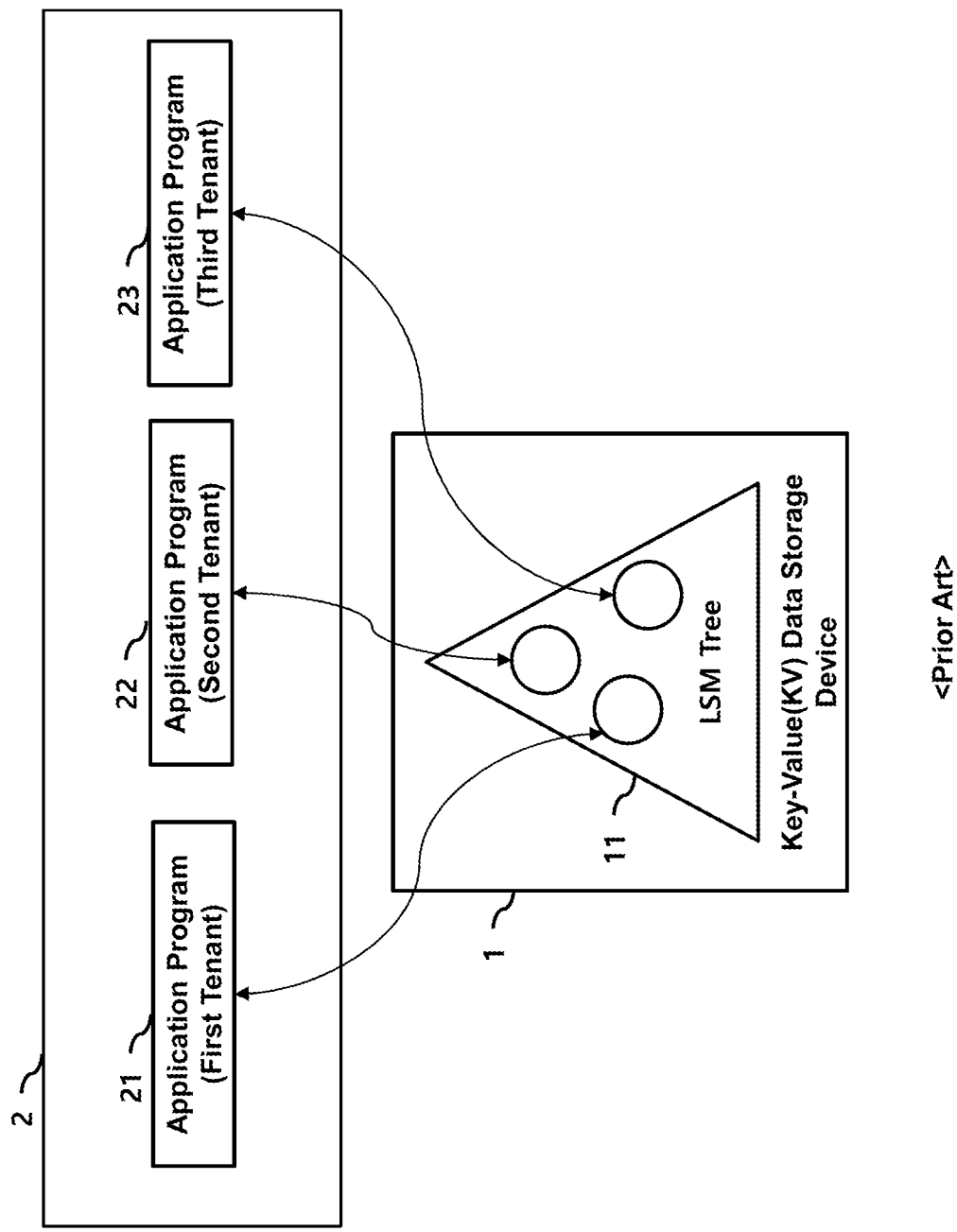
FIG. 1 illustrates a conventional data storage device.
Figure 2:
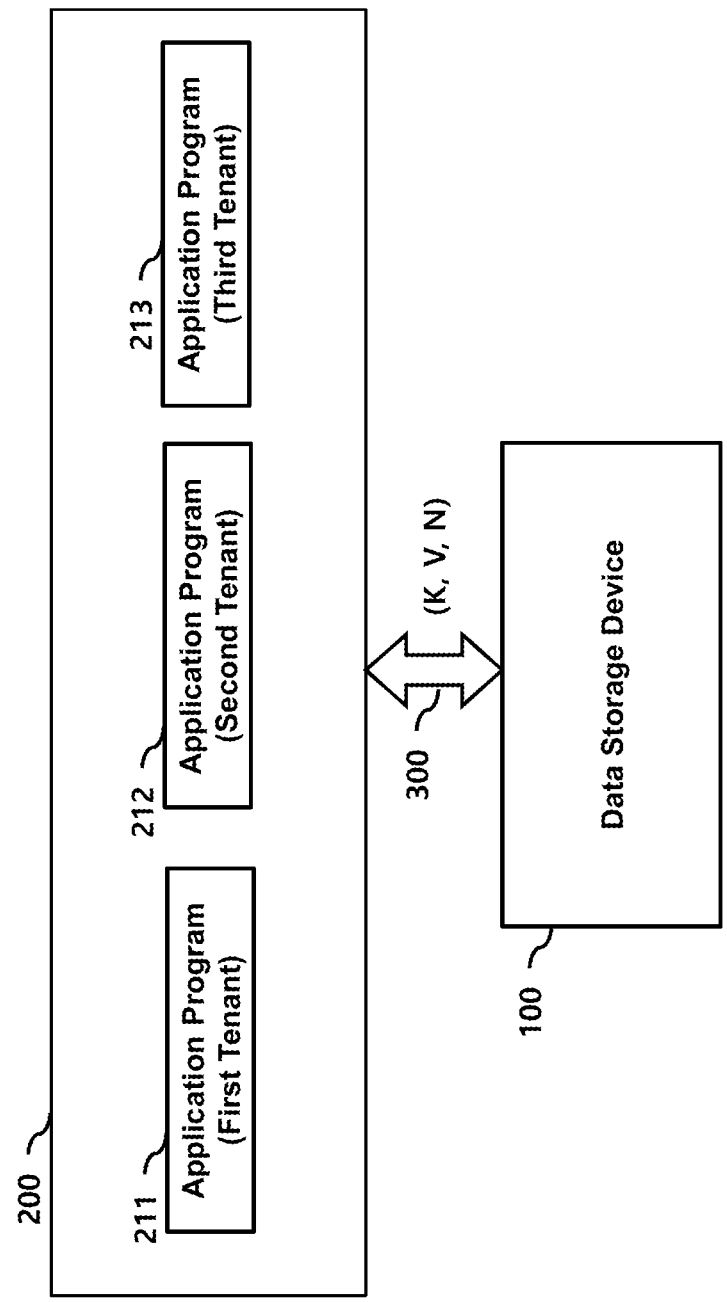
FIG. 2 illustrates a system including a data storage device according to an embodiment of the present disclosure.

FIG. 2 illustrates a system including the data storage device 100 according to an embodiment of the present disclosure.

The data storage device 100 is a key-value (KV) based data storage device and processes a KV command based on a key and a value.

The data storage device 100 is connected to a host 200 through an interface circuit 300.

In the host 200, a plurality of application programs 211, 212, and 213 generate read and write requests for the data storage device 100. The plurality of application programs respectively correspond to a plurality of tenants.

Each tenant may be identified by a tenant identifier N. Hereinafter, the tenant identifier N may be referred to as a namespace.

In the present disclosure, the data storage device 100 processes the KV command with reference to the tenant identifier, that is, the namespace, as will be described in detail below.

In an embodiment, the interface circuit 300 conforms to the PCI Express (PCIe) standard, through which a KV command extending the Nonvolatile Memory Express (NVMe) protocol may be transmitted.

In this case, the KV command corresponds to a KV request, and may be one of a read command GET and a write command PUT.

A technique for providing a KV command from a host to a data storage device, a technique for processing a KV command from such a data storage device, and a detailed configuration and operation of such a data storage device are described in the Korean Patent Publication No. 10-2021-0063862A. Therefore, a detailed description thereof will be omitted.

Unlike the prior art, the data storage device 100 considers a tenant identifier N, that is, a namespace, while processing a KV command. That is, in the present disclosure, the KV command includes a namespace N as an argument as well as a key K and a value V.

A namespace ID field already existing in the NVMe protocol can be used to pass the namespace N.

Figure 3:
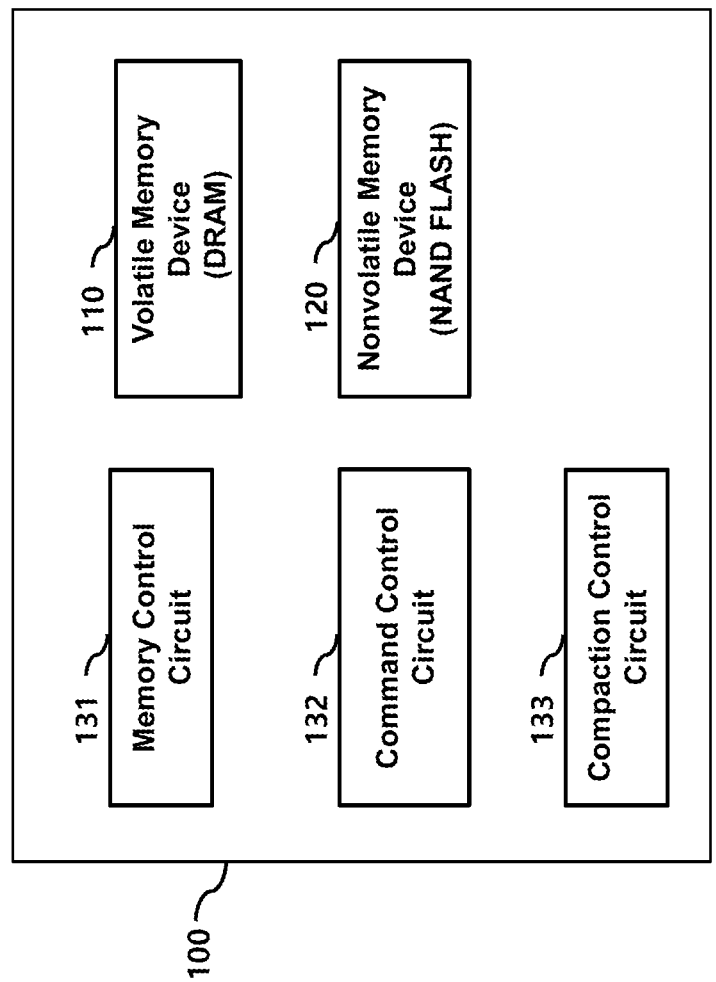
FIG. 3 illustrates a data storage device according to an embodiment of the present disclosure.

FIG. 3 illustrates a data storage device 100 according to an embodiment of the present disclosure.

The data storage device 100 includes a volatile memory device 110 and a nonvolatile memory device 120.

In the present embodiment, the volatile memory device 110 includes a Dynamic Random Access Memory (DRAM), but embodiments are not limited thereto. Hereinafter, the volatile memory device 110 may be referred to as a DRAM.

Also, in the present embodiment, the nonvolatile memory device 120 includes a NAND flash memory device, but embodiments are not limited thereto. Hereinafter, the nonvolatile memory device 120 may be referred to as a flash memory device.

In this embodiment, the volatile memory device 110 and the nonvolatile memory device 120 store a data structure such as an LSM tree.

A conventional data storage device organizes and manages an LSM tree using only a key and a value regardless of a namespace.

In contrast, the data storage device 100 according to the present embodiment organizes and manages an LSM tree by using a namespace as well as a key and a value.

Figure 4:
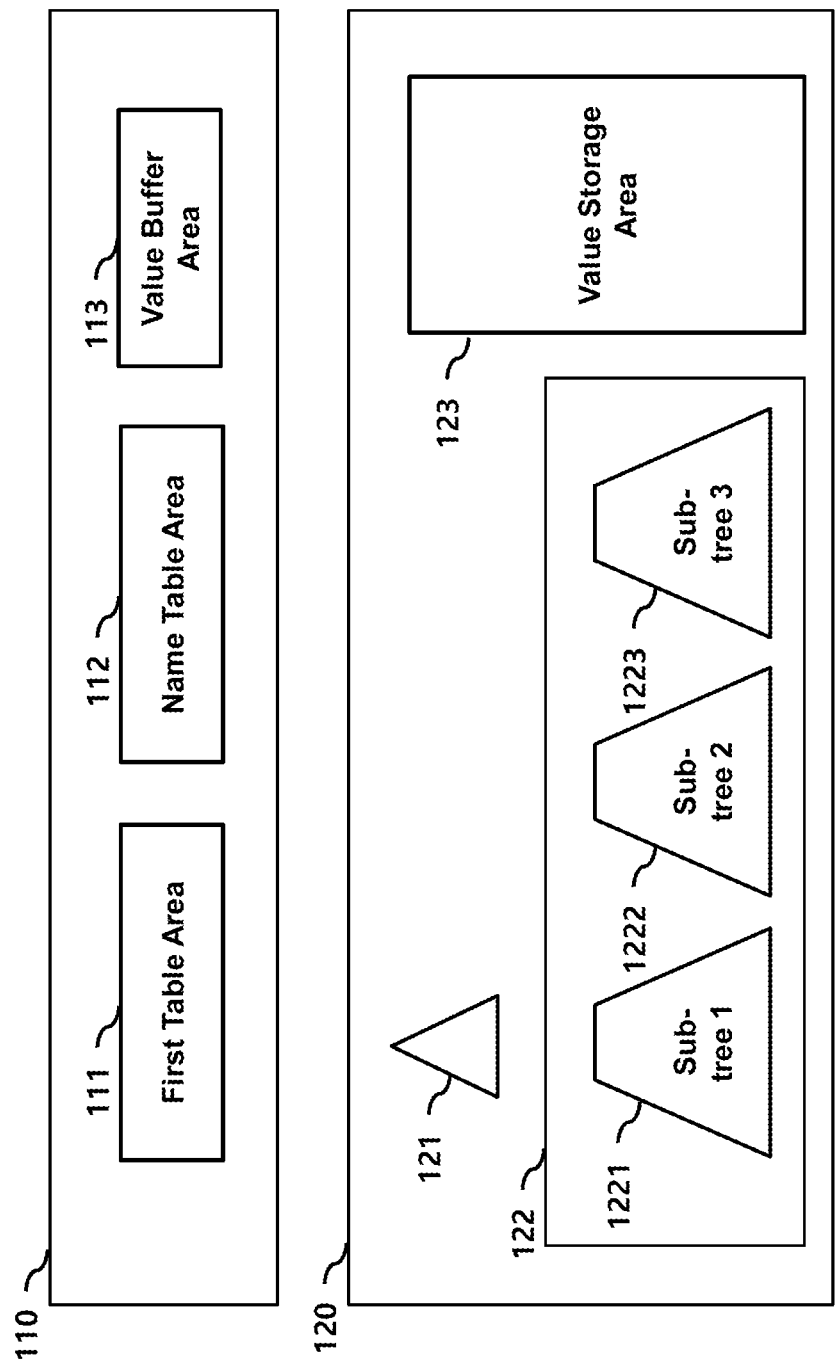
FIG. 4 illustrates contents of a volatile memory device and a nonvolatile memory device according to an embodiment of the present disclosure.

FIG. 4 illustrates a data structure of an LSM tree stored in the data storage device 100 according to an embodiment of the present disclosure.

The volatile memory device 110 includes a first table area 111 and a name table area 112, and the nonvolatile memory device 120 includes a second table area 121 and a subtree area 122. The subtree area 122 may store a plurality of subtrees 1221, 1222, and 1223.

The first table area 111 may store a first table, and the second table area 121 may store a plurality of second tables corresponding to level 0 of the LSM tree.

In addition, each of the plurality of subtrees 1221, 1222, and 1223 includes a plurality of second tables corresponding to level 1 or lower levels of the LSM tree.

Hereinafter, a level having a larger level number indicates the level being a lower level.

The first table corresponds to a temporary table or a MemTable in the LSM tree, and the second table corresponds to a sorted string table (SSTable) in the LSM tree.

Accordingly, hereinafter, the first table may be referred to as a temporary table or a MemTable and the second table may be referred to as an SSTable.

The number of SSTables allocated to level 0 and lower levels in the LSM tree may vary according to an embodiment, and in general, a larger number of SSTables may be allocated to a lower level.

When the temporary table is flushed from the first table area 121, the flushed contents are stored as one SSTable in the second table area 121.

When there is no free space in the second table area 121, an operation of moving one or more of the SSTables included in the second table area 121 to a lower level is performed, which is referred to as a compaction operation. This will be disclosed in detail below.

Unlike the prior art, in this embodiment, the LSM tree includes a space independently allocated to a tenant.

In this embodiment, the first table area 111 and the second table area 121 are shared by all tenants. However, key and offset information are stored together with a namespace that identifies an associated tenant and is used to manage the LSM tree.

In the present embodiment, each of the plurality of subtrees 1221, 1222, and 1223 is associated with a respective tenant, and information associated with another tenant is not stored therein.

For example, the first subtree 1221 may be associated with a first tenant, and forms an LSM tree together with the portion associated with the first tenant among the first table area 111 and the second table area 121. Accordingly, the first subtree 1221 may be understood as a set of level 1 or lower levels of SSTables storing data related to the first tenant.

Similarly, the second subtree 1222 may be associated with a second tenant, and forms an LSM tree together with a portion associated with the second tenant among the first table area 111 and the second table area 121. Accordingly, the second subtree 1222 may be understood as a set of level 1 or lower levels of SSTables storing data related to the second tenant.

In addition, the third subtree 1223 is associated with a third tenant, and forms an LSM tree together with a portion associated with the third tenant among the first table area 111 and the second table area 121. Accordingly, the third subtree 1223 may be understood as a set of level 1 or lower levels of SSTables storing data related to the third tenant.

Returning to FIG. 3, the data storage device 100 further includes a memory control circuit 131, a command control circuit 132, and a data structure management circuit 133.

The memory control circuit 131 controls an operation of reading and writing data to and from the volatile memory device 110 and the nonvolatile memory device 120, and for this purpose, may include a DRAM controller and a flash memory controller.

The flash memory controller may further perform operations such as mapping table management, garbage collection, and wear leveling.

Since the DRAM controller and the flash memory controller themselves are conventional technologies, descriptions thereof will be omitted.

The command control circuit 132 may query the LSM tree or add new information to the LSM tree to process the KV command.

The KV command may be one of a GET command for a read operation and a PUT command for a write operation.

As aforementioned, the configuration and operation of a data storage device for processing a KV command using a key and a value but without consideration of a namespace has been disclosed in the prior art, and thus a detailed description thereof will be omitted.

In the present disclosure, because embodiments process the KV command by additionally considering the namespace, embodiments will be described below focusing on the operation of the command control circuit 132 related thereto.

The command control circuit 132 accesses the volatile memory device 110 and the nonvolatile memory device 120 to process the KV command, and for this purpose, the memory control circuit 131 can be used.

The compaction control circuit 133 manages the compaction operation in the LSM tree. In particular, the compaction control circuit 133 considers the namespace when performing the process of moving an SSTable stored in the second table area 121 to the subtree area 122, as will be described in detail below.

Figure 5:
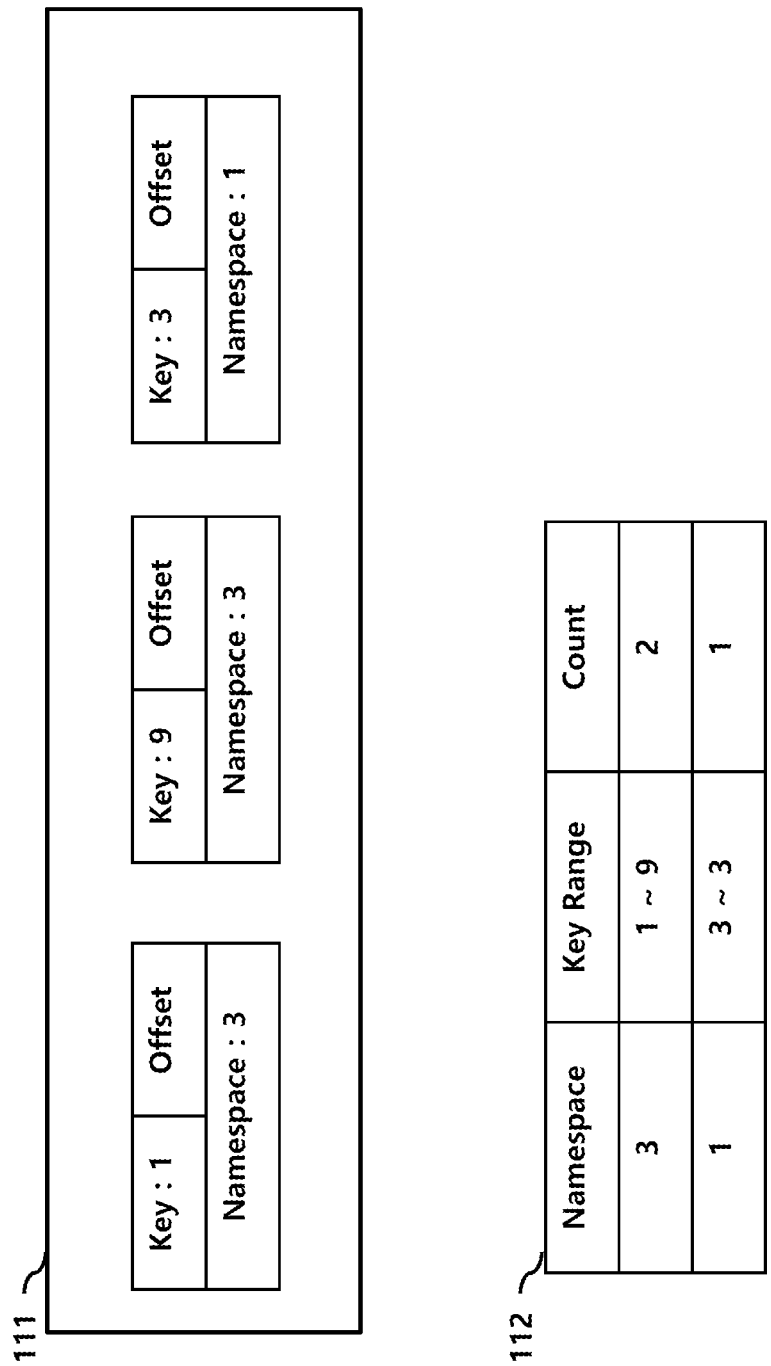
FIG. 5 illustrates a first table area and a name table area according to an embodiment of the present disclosure.

FIG. 5 illustrates structures of the first table area 111 and the name table area 112.

The first table area 111 stores a temporary table or a MemTable, which includes a key corresponding to a KV command, an offset, and tenant information associated therewith.

In this embodiment, the temporary table includes a key field, an offset field, and a namespace field, and stores a key, an offset, and a namespace associated with a KV command as unit information.

For example, when a PUT command for a write operation is transmitted from the host, new unit information including a key, an offset, and a namespace corresponding to the PUT command is created and stored in the temporary table. The offset may correspond to a location in the value buffer area 123 for storing a value included in the PUT command.

A plurality of unit information may be stored in the in the temporary table, and in embodiments may be stored in the form of a skip list.

The name table area 112 stores a name table for managing information related to a namespace stored in a temporary table.

Each entry in the name table contains a namespace field, a key range field, and a count field. For each namespace, the key range field stores the range of keys existing in the temporary table, and the count field stores the number of corresponding keys.

Referring to the first table area 111 in FIG. 5, since there are keys 1 and 9 corresponding to namespace 3, the key range field is set to 1 to 9 and the count field is set to 2 for the name table entry for namespace 3. And since there is key 3 corresponding to namespace 1, the key range field is set to 3 and the count field is set to 1 for the name table entry for namespace 1.

Figure 6:
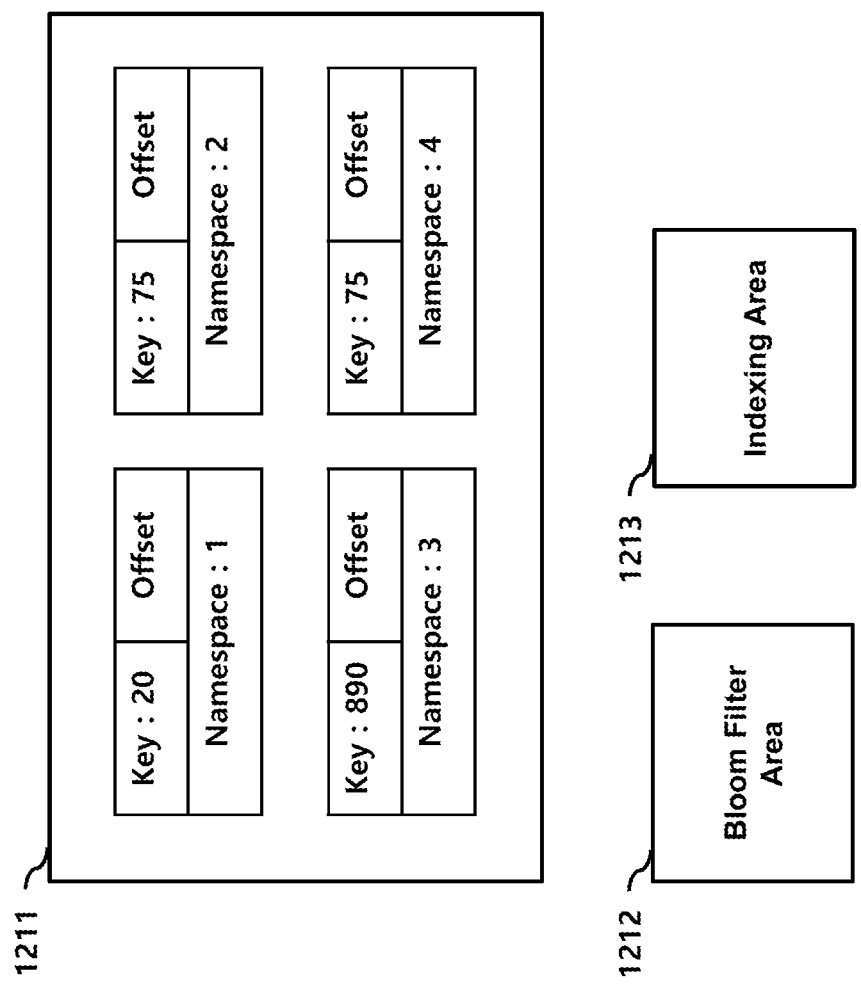
FIG. 6 illustrates a sorted string table (SSTable) according to an embodiment of the present disclosure.

FIG. 6 illustrates a structure of an SSTable stored in the second table area 121.

An SSTable includes a meta area 1211, a Bloom filter area 1212, and an indexing area 1213.

The meta area 1211 stores a plurality of unit information each including a key, an offset, and a namespace. As in the unit information stored in the first table area 111, the offset in the unit information stored in the meta area 1211 may correspond to a location where a value corresponding to the key is stored in the value storage area 123.

In the present embodiment, because the second table area 121 is shared by a plurality of tenants, each unit information in an SSTable included in the second table area 121 includes namespace information for identifying a tenant.

When temporary tables of the first table area 111 are flushed, they may be stored in the meta area 1211.

The Bloom filter area 1212 stores information for a function for identifying a key stored in the meta area 1211. In the disclosed embodiment, the function includes a Bloom filter, but embodiments are not limited thereto.

The indexing area 1213 includes information about the range of keys stored in the meta area 1211.

The bloom filter area 1212 and the indexing area 1213 are also used in an SSTable of a conventional LSM tree, and a detailed description thereof will be omitted.

As aforementioned, each of the subtrees 1221, 1222, and 1223 included in the subtree area 122 includes a plurality of SSTables similar to composition to the SSTable shown in FIG. 6, except that because each subtree corresponds to a single respective tenant, an SSTable in the subtree area 122 does not need to store namespace information.

Returning to FIG. 4, the volatile memory device 110 further includes a value buffer area 113, and the nonvolatile memory device 120 further includes a value storage area 123.

The value storage area 123 is a place where a value corresponding to a key is stored. As described above, an offset corresponds to a location where a value corresponding to a key is stored in the LSM tree.

The value buffer area 113 is an area for temporarily storing values. For example, a value transmitted from the host 200 to be written to the value storage area 123 is temporarily stored, and data that has been read from the value storage area 120 is temporarily stored in the value buffer area 113.

Figure 7:
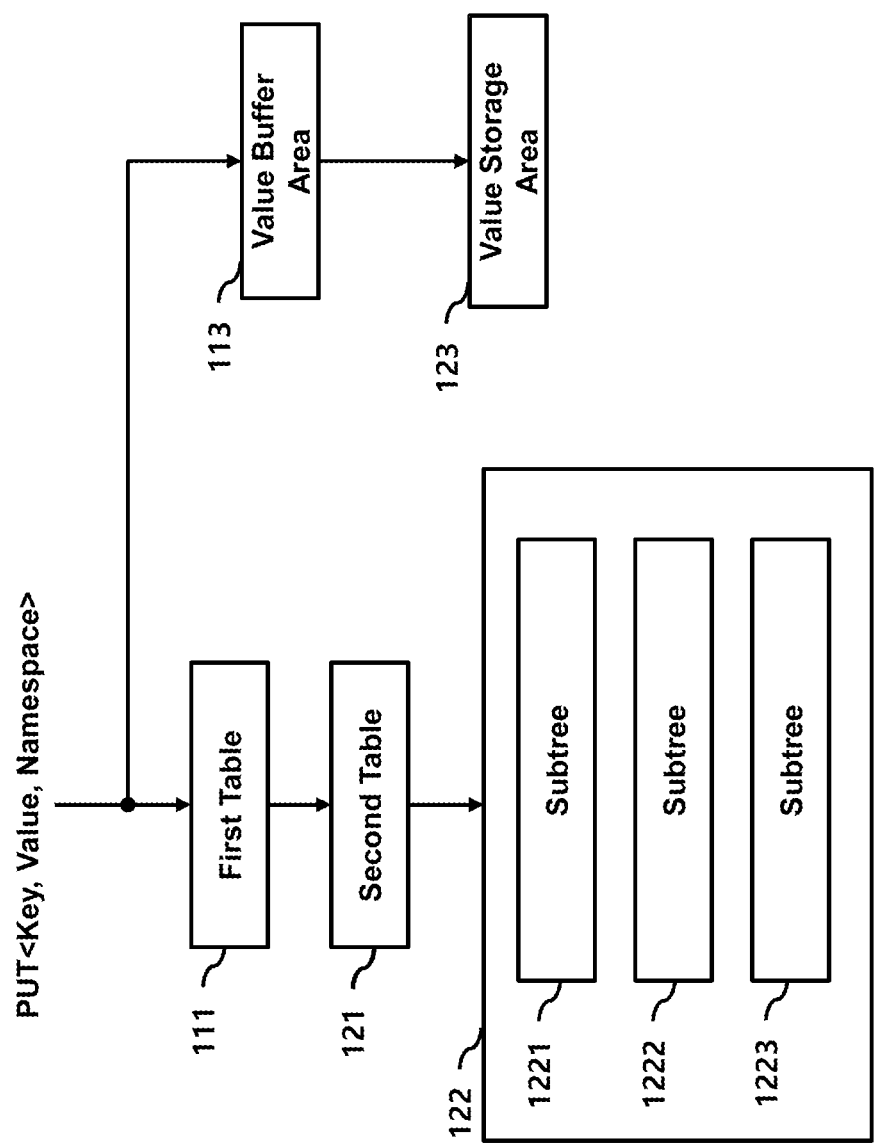
FIG. 7 illustrates a write operation of a data storage device according to an embodiment of the present disclosure.

FIG. 7 illustrates an operation to process a PUT command in the data storage device 100.

The PUT command is for a write operation, and since the operation is substantially the same as that disclosed in the Korea Patent Publication No. 10-2021-0063862A, a detailed description thereof will be omitted.

However, in the present disclosure, the PUT command provided by the host further includes a namespace as an argument.

The command control circuit 132 sequentially queries corresponding subtrees of the first table area 111, the second table area 121, and the subtree area 122 using the key and the namespace to obtain the offset corresponding thereto. In this case, the corresponding subtrees are limited to the subtrees corresponding to the namespace included in the argument, so that among the subtrees 1221, 1222, and 1223, at most one subtree is queried.

The value provided with the PUT command is stored in the value storage area 123 using the offset found with the key and the namespace, and the existing value is invalidated. The new offset of the address where the value is to be stored is stored in the temporary table of the first table area 111 together with the key and the namespace.

Except for using the namespace, other specific operations are the same as those described in the aforementioned prior art.

Figure 8:
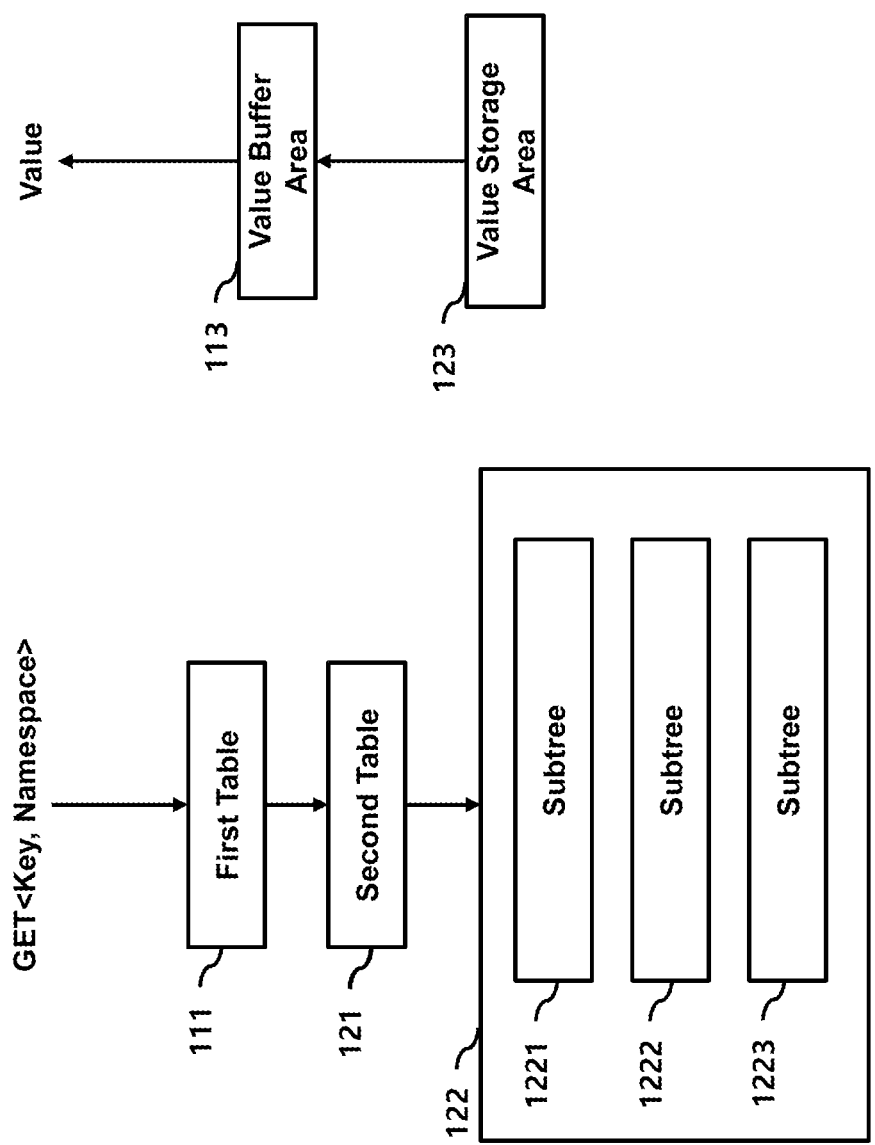
FIG. 8 illustrates a read operation of a data storage device according to an embodiment of the present disclosure.

FIG. 8 is a diagram for illustrating an operation to process a GET command in the data storage device 100.

Since the processing process of the GET command for the read operation is substantially the same as that of the aforementioned prior art, a detailed description thereof will be omitted.

However, in the present invention, the namespace is included as an argument along with the key in the GET command provided by the host.

The command control circuit 132 queries the corresponding subtrees of the first table area 111, the second table area 121, and the subtree area 122 using the key and the namespace to obtain the offset corresponding thereto. In this case, the corresponding subtrees are limited to the those corresponding to the namespace included in the argument, so that among the subtrees 1221, 1222, and 1223, at most one subtree is queried.

The value found in the value storage area 123 by using the offset found with the key and the namespace is stored in the value buffer area 113 and provided to the host 200.

Hereinafter, the operation of the compaction control circuit 133 will be described in detail.

As described above, when there is no free space in the temporary table of the first table area 111, the temporary table is flushed into an SSTable of the second table area 121.

Therefore, free space needs to be maintained in the second table area 121. If there is no free space in the second table area 121, an operation is required to move an SSTable included in the second table area 121 to one or more SSTables of a lower level existing in the subtree area 122.

In the present embodiment, an SSTable included in the second table area 121 stores unit information related to one or more tenants, but each SSTable included in the subtree area 122 contains unit information related to only one specific tenant according to the subtree.

Accordingly, the compaction operation of moving an SSTable from a first level within one of the subtrees in the subtree area 122 to a second level within that subtree that is lower than the first level is similar to the prior art, and thus it will not be separately disclosed.

Hereinafter, a compaction operation for moving an SSTable from level 0 (such as in the second table area 121) to level 1 (such as in the subtree area 122) will be described.

Figure 9:
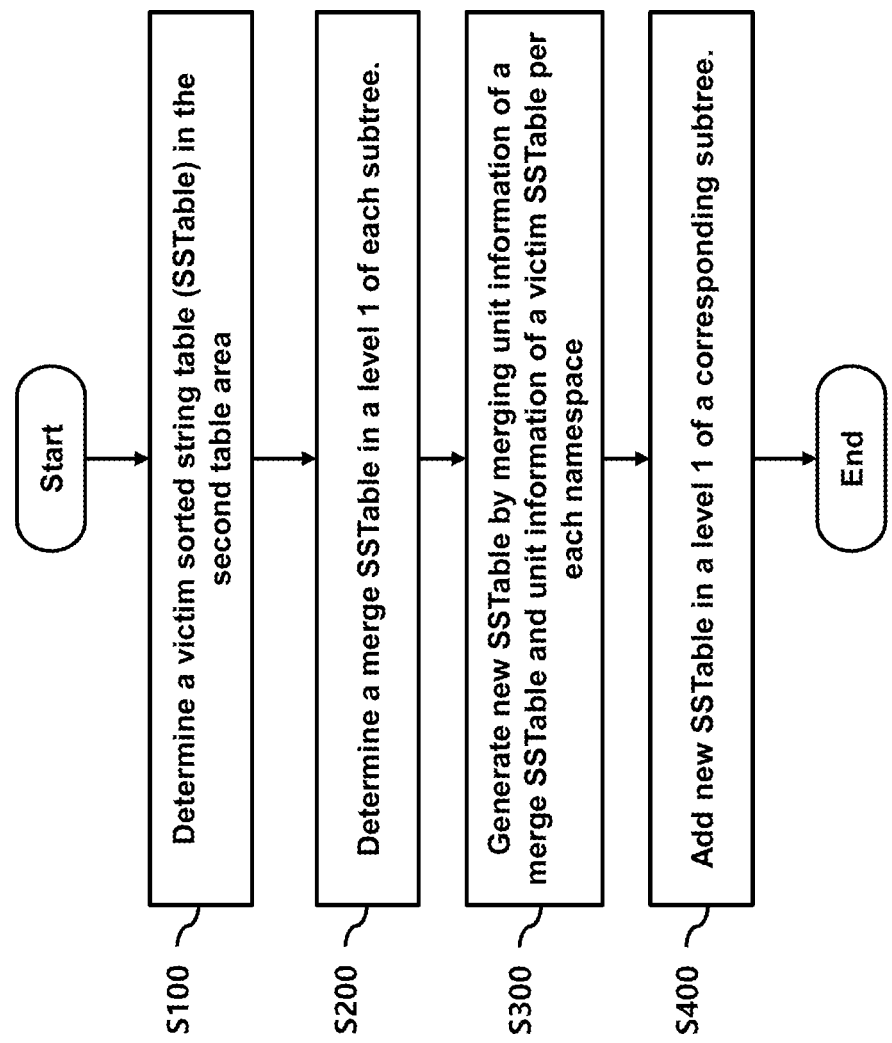
FIG. 9 is a flowchart illustrating a compaction operation of a data storage device according to an embodiment of the present disclosure.

FIG. 9 is a flowchart illustrating such a compaction operation.

First, an SSTable to be moved to a lower level is selected in the second table area 122 at S100. The SSTable to be moved to a lower level is referred to as a victim SSTable.

Selecting the victim SSTable among the SSTables stored in the second table area 122 is not limited to a specific method.

For example, an SSTable created least recently may be selected as the victim SSTable or an SSTable accessed least recently may be selected as the victim SSTable.

One or more SSTables may be selected as the victim SSTable.

Next, a merge SSTable is selected in level 1 of each subtree at S200. In an embodiment, when the victim SSTable does not include unit information including a namespace of a subtree, a merge SSTable may not be selected from that subtree.

Each of the selected merge SSTables is merged with the victim SSTable.

To select the merge SSTable, the key range of the victim SSTable is considered.

When determining the merge SSTable, it is desirable to select one that includes a key that overlaps the key range of the victim SSTable.

However, for example, if there is no SSTable including a key overlapping the key range of the victim SSTable in a subtree, a merge SSTable may not be selected from that subtree.

Next, for each merge SSTable, a new SSTable is generated using the information of the merge SSTable and the unit information included in the victim SSTable and having a namespace corresponding to the namespace corresponding to the subtree of the merge SSTable at S300. At this time, the bloom filter area and the indexing area are newly created according to the merged information.

When a merge SSTable is not selected from a subtree and the victim SSTable includes unit information having a namespace corresponding to that subtree, a new SSTable may be created for that subtree using only the unit information included in the victim SSTable and having a namespace corresponding to the namespace associated with that subtree.

Finally, the new SSTable is added to level 1 of the corresponding subtree at S400. The merge SSTable used to create the new SSTable, if there was one, may then be deleted.

FIGS. 10A to 10F illustrate a compaction operation.

FIG. 10A shows the victim SSTable selected in the first table area 111. In FIGS. 10A to 10F, two victim SSTables are selected.

In each unit information shown in FIGS. 10A to 10F, K indicates a key and N indicates a namespace, but the offset is not shown.

FIG. 10B illustrates a table showing namespaces existing in the victim SSTables and key ranges corresponding to the namespaces. A key range can be created using the maximum and minimum values of the keys corresponding to each namespace.

FIGS. 10C, 10D, 10E and 10F show subtrees respectively corresponding to namespaces 1, 2, 3, and 4.

In FIG. 10C, the table indicated by the dotted line represents a merge SSTable selected in level 1 of a subtree corresponding to namespace 1.

In the table of FIG. 10B, the key range corresponding to namespace 1 is 6 to 60, therefore in FIG. 10C an SSTable including the key 7 included in this range is selected as the merge SSTable from among the SSTables of the subtree corresponding to namespace 1.

The table indicated by the dotted line in FIG. 10D represents a merge SSTable selected in level 1 of the subtree corresponding to namespace 2.

In the table of FIG. 10B, the key range corresponding to namespace 2 is 9 to 22, therefore in FIG. 10D an SSTable including the key 8 included in this range is selected as the merge SSTable from among the SSTables of the subtree corresponding to namespace 2.

FIG. 10E shows a subtree corresponding to namespace 3.

In the table of FIG. 10B, the key range corresponding to namespace 3 is 2 to 38, but there is no SSTable including a key included in this range in the subtree corresponding to namespace 3. Therefore, a merge SSTable corresponding to level 1 of namespace 3 is not selected.

FIG. 10F shows a subtree corresponding to namespace 4.

In the table of FIG. 10F, the key range corresponding to namespace 4 is 7 to 7, but there is no SSTable including the key included in this range in the subtree corresponding to namespace 4. Therefore, a merge SSTable corresponding to level 1 of namespace 4 is not selected.

The table indicated by the solid line in FIG. 10C is a new SSTable added to level 1 of the subtree corresponding to namespace 1.

This is generated by merging keys 6, 11, and 60 corresponding to namespace 1 among the keys included in the victim SSTable, and key 7 included in the merge SSTable indicated by a dotted line in FIG. 10C, along with the offsets (not shown) corresponding to each key. As a new SSTable is added, the merge SSTable is invalidated.

When creating a new SSTable, it can be merged using the merge sort algorithm, and the corresponding bloom filter area and indexing area are updated at this time.

If there is a common key in the victim SSTable and the merge SSTable, since the information corresponding to the common key stored in the victim SSTable is the latest information, the information corresponding to the common key included in the merge SSTable can be ignored.

The table indicated by the solid line in FIG. 10D is a new SSTable added to level 1 of the subtree corresponding to namespace 2.

This is generated by merging keys 9 and 22 corresponding to namespace 2 among the keys included in the victim SSTable and keys 8 and 40 included in the merge SSTable indicated by a dotted line in FIG. 10D, along with the offsets (not shown) corresponding to each key. As a new SSTable is added, the merge SSTable is invalidated.

The table indicated by a solid line in FIG. 10E is a new SSTable added to level 1 of the subtree corresponding to namespace 3.

In this case, since the merge SSTable does not exist, it is created and added using keys 2 and 38 corresponding to namespace 3 among the keys included in the victim SSTable, along with the offsets (not shown) corresponding to each key.

The table indicated by the solid line in FIG. 10F is a new SSTable added to level 1 of the subtree corresponding to namespace 4.

In this case, since the merge SSTable does not exist, it is created and added using key 7 corresponding to namespace 4 among the keys included in the victim SSTable, along with the offsets (not shown) corresponding to each key.

Although various embodiments have been illustrated and described, various changes and modifications may be made to the described embodiments without departing from the spirit and scope of the invention as defined by the following claims.

What is claimed is:

1. A data storage device comprising:
   a volatile memory device including a first table area storing a first table having a plurality of first unit information; and
   a nonvolatile memory device including a subtree area and a second table area, the second table area storing one or more sorted string tables (SSTables) of a level 0 each having a meta area including a respective plurality of first unit information,
   wherein each first unit information includes a key corresponding to a respective key-value (KV) command and a namespace from among a plurality of namespaces, the namespace identifying a tenant providing the respective KV command,
   wherein the second table area and the subtree area form a data structure which can be queried with a key included in a KV command,
   wherein the subtree area includes a plurality of subtrees respectively corresponding to the plurality of namespaces, and
   wherein each of the plurality of subtrees stores an SSTable of level 1 having a meta area having a plurality of second unit information each having a key related with a namespace corresponding to that subtree.

2. The data storage device of claim 1, wherein the volatile memory device further includes a name table storing a key range and number of keys corresponding to a namespace of one or more first unit information stored in the first table area.

3. The data storage device of claim 1, further comprising:
   a memory control circuit configured to control read and write operations of the volatile memory device and the nonvolatile memory device; and
   a command control circuit configured to process a KV command by querying the data structure according to a KV command provided from a host by using the memory control circuit.

4. The data storage device of claim 3, wherein when a put command corresponding to a write operation is provided from a host, the data storage device generates a new first unit information using a key included in the PUT command and a namespace included in the PUT command and adds the new first unit information into the first table area.

5. The data storage device of claim 1, wherein the second table area includes two or more SSTables of level 0.

6. The data storage device of claim 5, wherein an SSTable of the level 0 includes a Bloom filter area being used to query a key in a meta area thereof and an indexing area including information about a range of one or more keys included in the meta area thereof.

7. The data storage device of claim 1, further comprising a compaction control circuit configured to generate a new SSTable corresponding to a namespace using a victim SSTable selected from among the one or more SSTables included the second table area and to store the new SSTable as an SSTable of level 1 in a subtree corresponding to the namespace.

8. The data storage device of claim 7, wherein the compaction control circuit identifies a key range of the namespace in the victim SSTable, selects one or more SSTables of level 1 existing in a subtree corresponding to the namespace, and generates a new SSTable by merging the victim SSTable and the merge SSTable.

9. The data storage device of claim 8, wherein the compaction control circuit selects an SSTable having a key that overlaps the key range of the namespace in the victim SSTable as the merge SSTable.

10. The data storage device of claim 8, wherein when a same key exists in the victim SSTable and in the merge SSTable, the compaction control circuit generates the new SSTable by ignoring second unit information of the merge SSTable corresponding to the same key.

11. The data storage device of claim 1, wherein the volatile memory device further includes a value buffer area that stores a data temporarily, and the nonvolatile memory device further includes a value storage area that stores a value corresponding to a key.

12. The data storage device of claim 11, wherein each first unit information and each second unit information further includes respective offset information identifying a location of a value corresponding to a key thereof.

13. An operating method of a data storage device including a table area storing a sorted string table (SSTable) of a level 0 having a plurality of first unit information each including a key corresponding to a respective key-value (KV) command and a namespace from among a plurality of namespaces, the namespace identifying a tenant providing the respective KV command, and a subtree area having a plurality of subtrees corresponding to the plurality of namespaces, each of the plurality of subtrees storing an SSTable of level 1 having a plurality of second unit information each having a key, the operating method comprising:
    selecting a victim SSTable in the table area;
    generating new SSTable corresponding to a first namespace by using the victim SSTable; and
    adding the new SSTable as an SSTable of level 1 in a subtree corresponding to the first namespace.

14. The operating method of claim 13, further comprising selecting a merge SSTable among a plurality of SSTable of level 1 in the subtree corresponding to the first namespace with reference to a key range of keys corresponding to the first namespace included in the victim SSTable,
    wherein the new SSTable is generated by merging the victim SSTable and the merge SSTable.

15. The operating method of claim 14, wherein an SSTable of level 1 having a key that overlaps the key range is selected as the merge SSTable.

16. The operating method of claim 14, wherein when a same key exists in the victim SSTable and in the merge SSTable, the new SSTable is generated by ignoring second unit information of the merge SSTable corresponding to the same key.

\* \* \* \* \*